US007047387B2

(12) United States Patent
Goodsell

(10) Patent No.: US 7,047,387 B2
(45) Date of Patent: May 16, 2006

(54) BLOCK CACHE SIZE MANAGEMENT VIA VIRTUAL MEMORY MANAGER FEEDBACK

(75) Inventor: Andrew E. Goodsell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 10/620,938

(22) Filed: Jul. 16, 2003

(65) Prior Publication Data

US 2005/0015562 A1    Jan. 20, 2005

(51) Int. Cl.
*G06F 12/12*    (2006.01)
(52) U.S. Cl. .................. 711/170; 711/170; 711/171; 711/172; 711/173; 711/129; 711/118
(58) Field of Classification Search ............... 711/205, 711/173, 170
See application file for complete search history.

(56) References Cited

U.S. PATENT DOCUMENTS

| 5,752,255 | A | * | 5/1998 | Jarvis ............................. 711/3 |
| 5,875,464 | A | * | 2/1999 | Kirk ............................. 711/129 |
| 6,681,297 | B1 | * | 1/2004 | Chauvel et al. ............. 711/130 |
| 2003/0105926 | A1 | * | 6/2003 | Rodriguez .................. 711/129 |

OTHER PUBLICATIONS

Microsoft Computer Dictionary, 1993, Microsoft, 2nd Edition, p. 286.*
TechWeb, TechEncyclopedia, Page http://www.techweb.com/encyclopedia/shared/printArticlePageSrc.jhtml?term=page As viewed on Aug. 22, 2005.*
TechWeb, TechEncyclopedia, Block http://www.techweb.com/encyclopedia/shared/printArticlePageSrc.jhtml?term=block As viewed on Aug. 22, 2005.*
Alonso, Raphael and Andrew W. Appel, "An Advisor for Flexible Working Sets", *Proceedings of the 1990 ACM SIGMETRICS Conference on Measurement and Modeling of Computer Systems*, pp. 153-162 (1990).
Froese, Kevin W. and Richard B. Bunt, "The Effect of Client Caching on File Server Workloads", *Proceedings of the 29th Annual Hawaii International Conference on System Sciences*, vol. 1, pp. 150-159 (1996).
Nelson et al., "Caching in the Sprite Network File System", *ACM Transactions on Computer Systems*, vol. 6, No. 4, pp. 134-154 (Nov. 1988).

* cited by examiner

*Primary Examiner*—B. James Peikari
*Assistant Examiner*—Leonid Kravets
(74) *Attorney, Agent, or Firm*—Workman Nydegger

(57) ABSTRACT

A method for calculating a block cache size for a host process or application on a computer based at least upon virtual memory page evictions and/or virtual memory page reclamations for the computer. A virtual memory page eviction is the act of removing the contents of a physical memory page for the purpose of loading it with the contents of another virtual memory page. A virtual memory page reclamation is the return of a page to a working set that was previously removed by the operating system due to memory constraints. The page must not have been evicted. Additional fundamental properties of the application and the computer may be used, such as available physical memory on the computer, total physical memory, and block evictions. A block eviction is the act of removing the contents of a block from the block cache for the purpose of loading it with new contents.

51 Claims, 8 Drawing Sheets

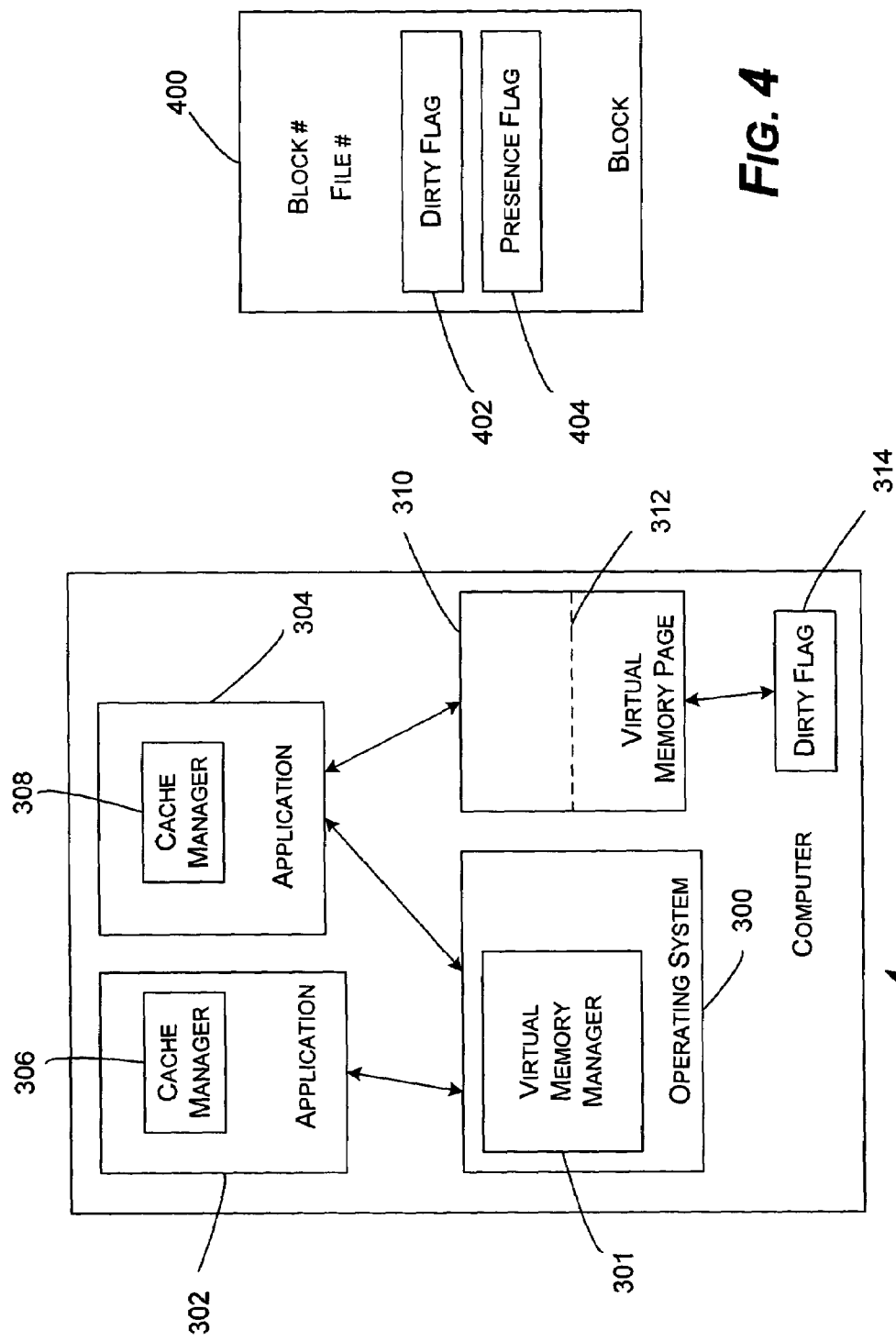

$$dCM/dt = AM/TM * dBE/dt - CM/TM * dAE/dt$$

Where
- CM = Cache Memory
- AM = Available Physical Memory
- TM = Total Physical Memory
- BE = Block Evictions
- AE = Approximated Virtual Memory Page Evictions
- t = time

FIG. 10
PRIOR ART

BLOCK CACHE SIZE MANAGEMENT VIA VIRTUAL MEMORY MANAGER FEEDBACK

TECHNICAL FIELD OF THE INVENTION

The present invention is related generally to memory management on a computer system, and is more specifically related to management of cache size for an application.

BACKGROUND OF THE INVENTION

There exists a class of server and other applications that access their data as "blocks," or contiguous chunks of memory of a fixed size. The server applications include, but are not limited to, file systems, databases, email, and directories. Usually, the server applications need to access far more data than can be held in the memory of the machine ("host machine") hosting the respective server application. As a result, many of these server applications choose to cache a portion of their data in memory, typically using some form of a block cache.

Due to the large number of possible host machine configurations on the market, it is not practical to statically determine an optimal size for a block cache for a server application at application coding time. Thus, many server applications make a decision at install time or run time as to the size of the block cache. Because the size of the block cache can have a dramatic impact on the performance of the server, the decision regarding the size of the block cache is an important one. Unfortunately, such a decision is usually very technical and fraught with details, such as the current and future configuration of the hardware and software of the host machine. These details render simplistic install time algorithms ineffective in general. In addition, taking such details into account requires that any run time tuning be done by a person with technical skills that exceed that of the typical server administrator. An even higher degree of difficulty occurs if the host machine hosts multiple different server applications that each contain such a block cache.

There have been many attempts to size caches using a variety of different algorithms. For example, an operating system might balance its file cache against its processes by regarding the file cache as a process with a working set. The operating system can then use an algorithm, such as the standard working set clock algorithm, to manage the size of the file cache along with the other processes. This system works fairly well, but a user mode application with a cache that is a subset of its own working set cannot take advantage of this behavior. Further, treating the cache as a process with a working set inextricably links the cache replacement policy with the cache sizing policy.

Another way to establish cache size is to permit the cache to take all available virtual memory except a fixed amount. This method may be used, for example, by a server application. If new applications startup, the cache for the server application will free memory as it is used by the new applications. One problem with this system is that if too many other applications startup, then the cache for the server application can be reduced to zero. Further, if more than one server application is running at the same time, then the size of the cache for each of the server applications will not always converge to a stable size under steady state load. Even worse, it is possible for such a solution to "runaway" by consuming memory indefinitely if a significant portion of its host process is paged out by the operating system.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment of the invention, a method is provided for calculating a block cache size for a host process or application on a computer based upon virtual memory page evictions and/or virtual memory page reclamations for the computer. A virtual memory page eviction is the act of removing the contents of a physical memory page for the purpose of loading it with the contents of another virtual memory page. A virtual memory page reclamation is the return of a non-evicted page to a working set that was previously removed by the operating system due to memory constraints.

In addition to the virtual memory page evictions and/or virtual memory page reclamations, fundamental properties of the application and the computer may be used in a calculation of a target block cache size. These properties include available physical memory, total physical memory, and block evictions. A block eviction is the act of removing the contents of a block from the block cache for the purpose of loading it with new contents.

In accordance with one aspect of the present invention, the block cache size may be determined by the following algorithm:

$$dCM/dt = AM/TM * dBE/dt - CM/TM * dPE/dt - dPR/dt$$

Where:
CM comprises Block Cache Memory Size
AM comprises Available Physical Memory
TM comprises Total Physical Memory
BE comprises Block Evictions
PE comprises Virtual Memory Page Evictions
PR comprises Virtual Memory Page Reclamations
t comprises time The method utilizes fundamental properties of the state of a host process or application and the entire computer with respect to the host operating system's virtual memory manager to automatically determine the size of a block cache for the host process or application. The technique may be used to balance the use of memory between a number of block caches, a number of other processes, the operating system, and its file cache. It can also determine the amount of memory assigned to each block cache as a function of its "need" for that memory.

Other features of the invention will become apparent from the following detailed description when taken in conjunction with the drawings, in which:

BRIEF DESCRIPTION OF THE DRAWINGS

FIG. 3 is a block diagram illustrating details of an architecture for the computer system of FIG. 2 that may be used in accordance with an embodiment of the invention;

FIG. 4 is a block diagram representing some information that may be included in a block in accordance with an aspect of the present invention;

FIG. 10 shows a prior art algorithm used to calculate target block cache size.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Prior to proceeding with a description of the various embodiments of the invention, a description of a computer and networking environment in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The terms "program" or "module" as used herein may connote a single program module or multiple program modules acting in concert. The terms "computer" and "computing device" as used herein include one or more devices that electronically execute one or more programs, such as personal computers (PCs), handheld devices, multi-processor systems, microprocessor-based programmable consumer electronics, network PCs, minicomputers, tablet PCs, laptop computers, consumer appliances having a microprocessor or microcontroller, routers, gateways, hubs and the like. "Computer" and "computing device" also includes distributed computing environments, where tasks are performed by remote processing devices that are linked through a communications network. In a distributed computing environment, programs may be located in both local and remote memory storage devices.

Figure 1:
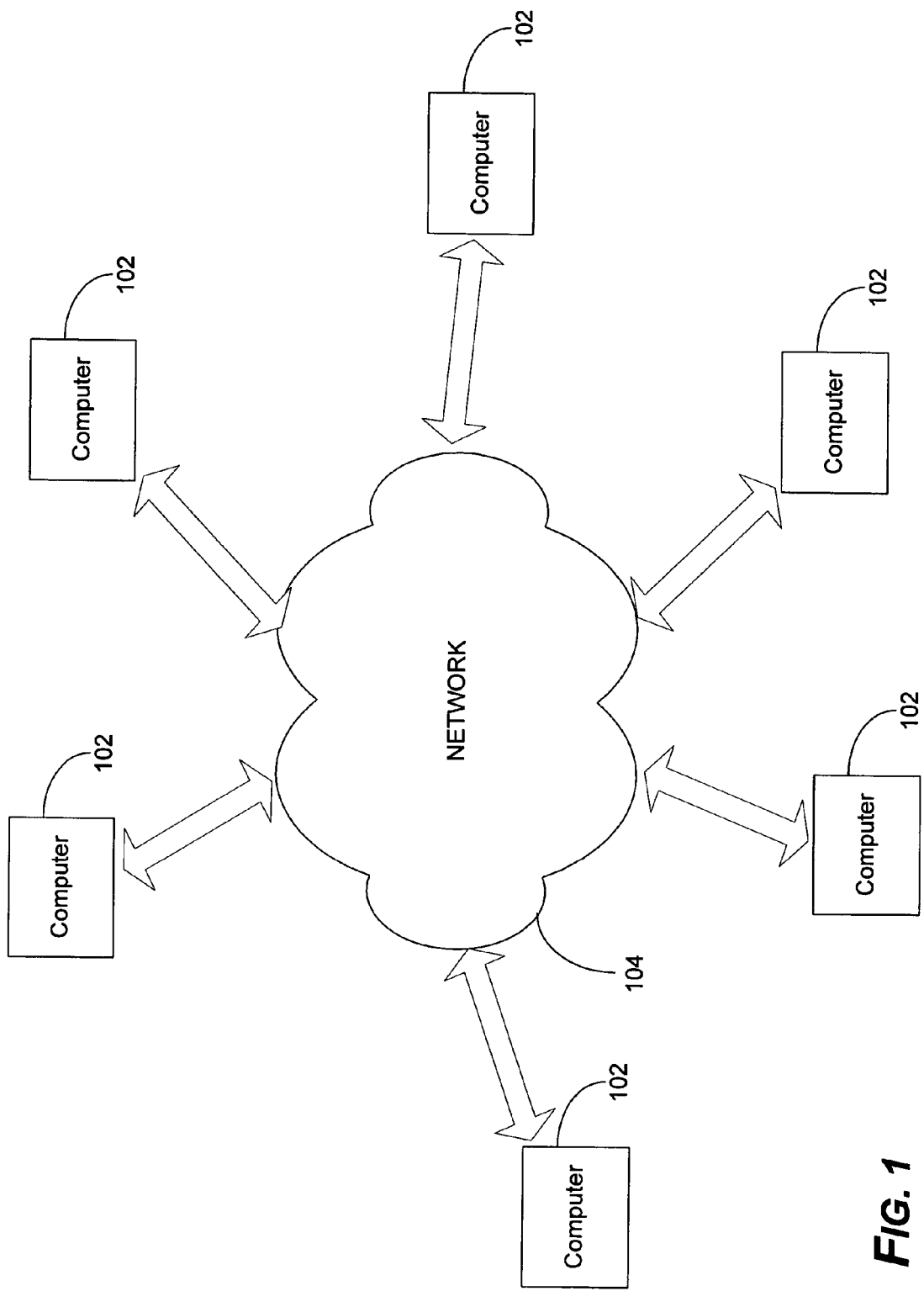
FIG. 1 is a schematic diagram illustrating computers connected by a network.

An example of a computer networking environment suitable for incorporating aspects of the invention is described with reference to FIG. 1. The example computer networking environment includes several computers 102 communicating with one another over a network 104, represented by a cloud. The network 104 may include many well-known components, such as routers, gateways, hubs, etc. which allow the computers 102 to communicate via wired and/or wireless media. When interacting with one another over the network 104, one or more of the computers 102 may act as clients, servers or peers with respect to other computers 102.

The embodiments described herein utilize the invention in connection with server applications. However, the various embodiments of the invention may be practiced on an individual computer that is not in a network, on clients, servers, peers or combinations thereof, even though specific examples contained herein may not refer to all of these types of computers.

Figure 2:
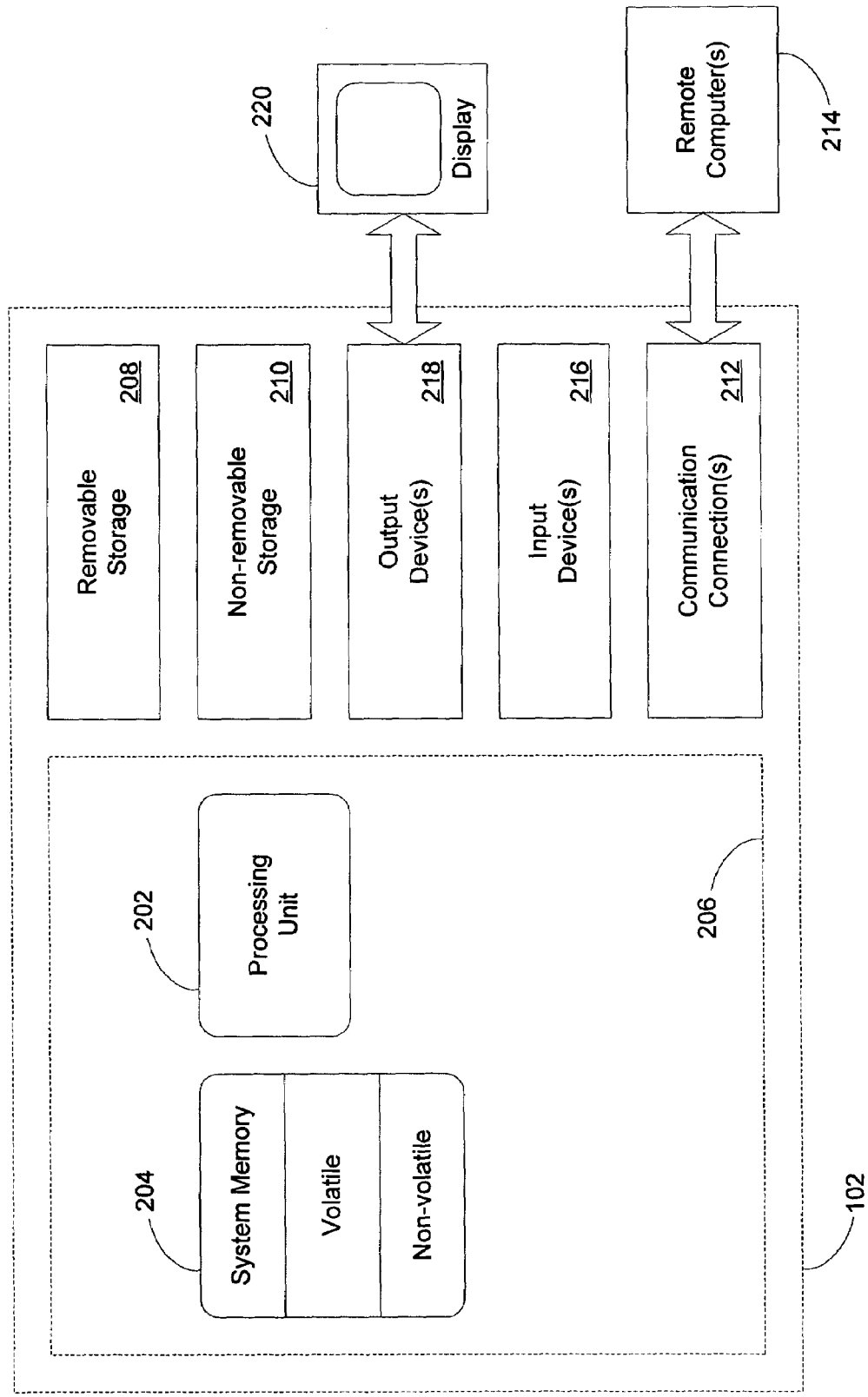
FIG. 2 is a schematic diagram generally illustrating an exemplary computer system usable to implement an embodiment of the invention.

Referring to FIG. 2, an example of a basic configuration for the computer 102 on which aspects of the invention described herein may be implemented is shown. In its most basic configuration, the computer 102 typically includes at least one processing unit 202 and memory 204. The processing unit 202 executes instructions to carry out tasks in accordance with various embodiments of the invention. In carrying out such tasks, the processing unit 202 may transmit electronic signals to other parts of the computer 102 and to devices outside of the computer 102 to cause some result. Depending on the exact configuration and type of the computer 102, the memory 204 may be volatile (such as RAM), non-volatile (such as ROM or flash memory) or some combination of the two. This most basic configuration is illustrated in FIG. 1 by dashed line 206.

The computer 102 may also have additional features/functionality. For example, computer 102 may also include additional storage (removable 208 and/or non-removable 210) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 212 that allow the device to communicate with other devices such as remote computers 214. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 216 such as a keyboard/keypad, mouse, pen, voice input device, touch input device, etc. Output devices 218 such as a display 220, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

FIG. 3 is a block diagram illustrating details of an architecture for the computer 102 that may be used in accordance with an embodiment of the invention. The computer 102 includes an operating system 300 having a virtual memory manager 301, and first and second applications 302, 304 associated with the operating system. The applications 302, 304 may be programs running on the computer 102, or may be associated with the computer. In an embodiment of the invention, the applications 302, 304 are server applications, and the computer 102 is a host machine for the server applications. Although described with reference to two applications, the present invention may be implemented with a single or any number of applications.

In the embodiment shown in FIG. 3, each of the applications 302, 304 includes a block cache manager 306, 308. In accordance with one embodiment, the block cache managers 306, 308 size block caches for the applications in accordance with the algorithm and/or methods discussed below.

As is known, the operating system 300, the applications 302, 304, and any other processes that are executing on the computer 102 utilize the memory 204 for that execution. A virtual memory manager (e.g., the virtual memory manager 301) allows processes that may not be entirely in the memory to execute by means of automatic storage allocation upon request. The term virtual memory refers to the abstraction of separating logical memory—memory as seen by the process—from physical memory—memory as seen by the processor. Because of this separation, the programmer needs to be aware of only the logical memory space while the operating system maintains two or more levels of physical memory space.

The virtual memory abstraction is implemented by using secondary storage to augment the processor's main memory. Data is transferred from secondary (e.g., hard disk) to main (e.g., RAM) storage as and when necessary and the data replaced is written back to the secondary storage according to a predetermined replacement algorithm. The portion of the hard drive set aside to use for virtual memory is called a "swap file." If the data swapped is designated a fixed size, this swapping is called paging, and the fixed chunks of data are referred to as "pages" or virtual memory pages." The set of pages that a process is currently using is called its "working set." When the entire working set is in main memory, few page faults will occur. A paging system which keeps track of the working set and makes sure it is in memory before the process is run is using the working set model. Although described as being used with a paging system, the present invention may be altered accordingly in accordance with different systems.

In accordance with an aspect of the present invention, the applications 302, 304 access their data as blocks, or contiguous chucks of memory of a fixed size. The block size is application specific, but is likely to be a power of two larger than or equal to 512 bytes. If a paging system is used, the blocks may be larger than, smaller than, or equal to the size of a page. For example, a page may be equal to two blocks in size (and thus may be formed by two blocks), or two pages may form one block. As another example, a block may be the size of a page.

A representation of a virtual memory page 310 is shown in FIG. 3. The virtual memory page 310 in the example is formed by two blocks, represented by the dividing dotted line 312. The virtual memory page 310 is associated with the application 304. Different virtual memory pages may be present and may be associated with the application 302 or other processes on the computer 102. For ease of description herein, a virtual memory page that may be associated with any process or application (including the applications 302 and 304) is referred to herein as a "virtual memory page 310."

The virtual memory page 310 includes a dirty flag 314 associated therewith that may be maintained, for example, by the kernel. The dirty flag 314 is used to indicate if the virtual memory page 310 needs to be written out to the swap file and is implicitly set whenever someone writes to the memory on the virtual memory page.

In accordance with one embodiment of the present invention and as shown in FIG. 4, each block 400 may include information, for example in the form of a header, that may be used to determine block cache size, as further described below. The information may alternatively be stored in another control structure elsewhere in the block, or may be stored separately from the block. The information may include, for example, a block number or numbers, a file number, a dirty flag 402, and a presence flag 404. The dirty flag 402 indicates whether a block needs to be written out to a main database file (or whatever is being cached) and is explicitly set by the application whenever a modification is made to data cached in that block. The function of the presence flag 404 is described below.

Figure 5:
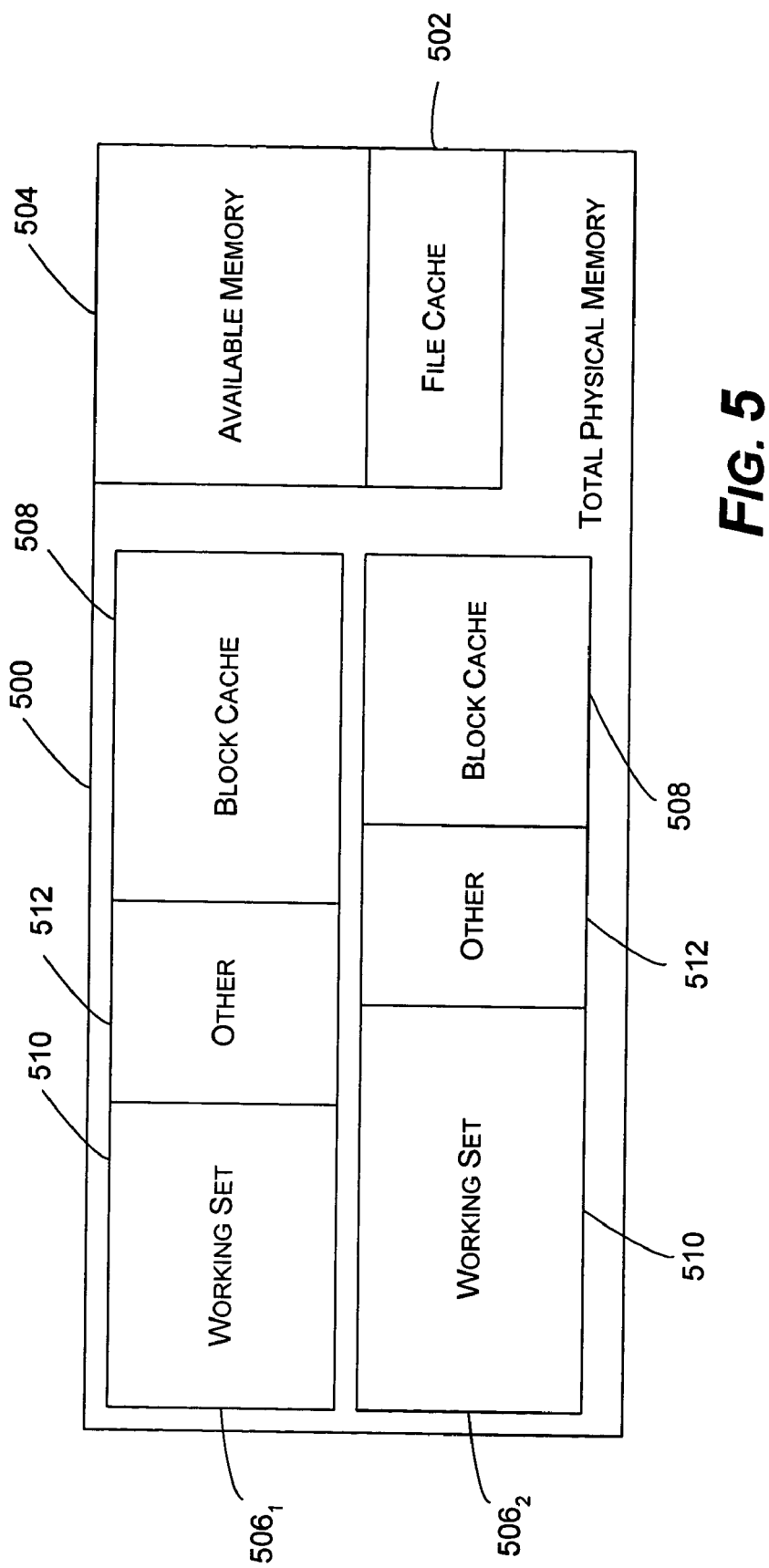
FIG. 5 shows a block diagram generally representing memory allocation for the computer of FIG. 2 in accordance with an aspect of the present invention.

FIG. 5 is a block diagram representing virtual memory allocation within the computer 102. Total physical memory is represented by the reference numeral 500, memory used by the file cache of the operating system by the numeral 502, and available memory by 504. Each application 302, 304 includes its own memory allocation $506_1$, $506_2$, having a block cache 508, a working set 510, and other memory allocation 512, if relevant. The representations are for illustrative purposes only, and actual memory allocation may be much different. For example, the block cache 508 and other components shown are not necessarily contiguous.

As is known, typically the size of the working set 510 may be set by the working set model and/or a replacement algorithm via the virtual memory manager 301. Such algorithms and/or models are well known, and are not described here so as to not obfuscate the invention.

In accordance with one embodiment of the invention, the size of a block cache 508 may be set by the respective application 302 or 304. In doing so, in accordance with one embodiment of the invention and as further described below, the application balances the use of memory between a number of block caches 508, a number of other processes, the operating system 300, and the file cache 502. To this end, an algorithm is defined for calculating a goal size of the block cache 508. Based upon this target, efforts are made to remove or add blocks to reach the goal.

Figure 6:
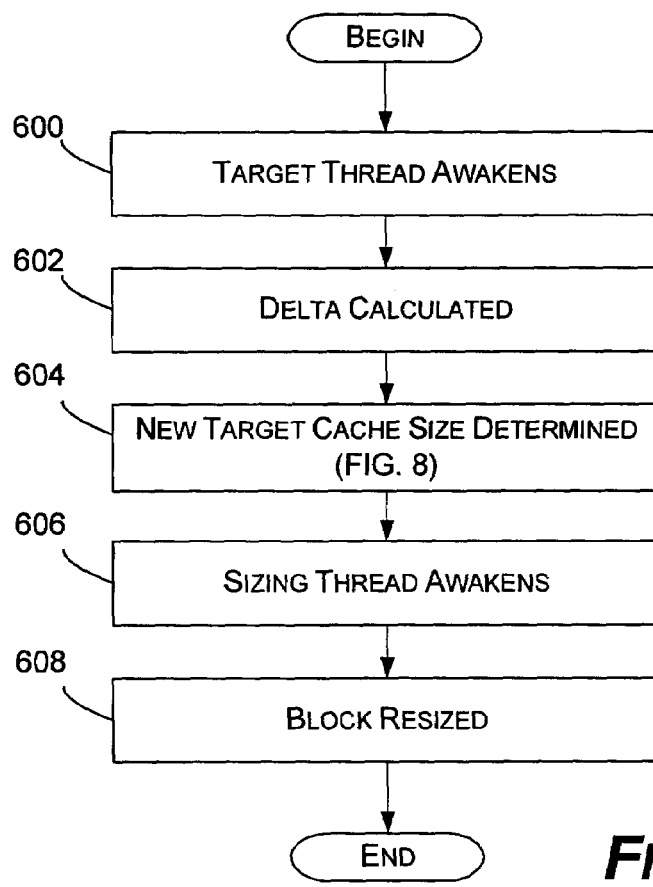
FIG. 6 is a flow diagram illustrating an example for sizing a block cache in accordance with an embodiment of the present invention.

FIG. 6 is a flow diagram generally representing steps for sizing a block cache 508 in accordance with the present invention. Beginning at step 600, a target thread awakens. At step 602, a delta (described below) is calculated for the new target size. The new target size is calculated based upon the delta in step 604 (described together with FIG. 8, below).

At step 606, a sizing thread awakens and attempts to size the block cache 508 in accordance with the target (step 608). This process may not be instantaneous because I/O may be required to remove blocks from the block cache 508. As such, the process is goal seeking and is not intended to instantaneously execute the intention of the equation. Rather, the process interprets the target as a goal towards which the size of the block cache 508 is driven over time.

One equation for determining the delta of step 602 above is:

$$dCM/dt = AM/TM * dBE/dt - CM/TM * dPE/dt - dPR/dt$$

Where:

CM = Block Cache Memory Size
AM = Available Physical Memory
TM = Total Physical Memory
BE = Block Evictions
PE = Virtual Memory Page Evictions
PR = Virtual Memory Page Reclamations
t = time The Cache Memory is the difference between the number of allocated blocks and the number of unused blocks in the block cache 508, multiplied by the block size. A block is considered to be "unused" if it is allocated but has never contained any useful data since it was allocated. The instrumentation of this parameter is application specific.

The Available Physical Memory is the amount of physical memory that the virtual memory manager 301 considers a possible candidate for immediate victimization by a new virtual memory page 310. Typically, this memory would not be considered to be an active part of a process working set. In the WINDOWS brand operating system, this value can be determined by calling GlobalMemoryStatus and inspecting the dwAvailPhys member of the returned MEMORYSTATUS struct.

The Total Physical Memory is the amount of physical memory on the host machine that can be used as virtual memory by any process on that machine. In the WINDOWS brand operating system, this value can be determined by calling GlobalMemoryStatus and inspecting the dwTotalPhys member of the returned MEMORYSTATUS struct.

If desired, Available Physical Memory divided by Total Physical Memory (AM/TM) may be substituted with Available Quota Memory (AQ) divided by Total Quota Memory (TQ) (together AQ/TQ), and Block Cache Memory Size divided by Total Physical Memory (CM/TM) may be substituted with Block Cache Memory Size divided by Total Quota Memory (CM/TQ). In this variation of the algorithm, the Total Quota Memory is the maximum amount of physical memory that can be used be a given process according to its quota. If no quota is set for the process then this is the same as Total Physical Memory. Otherwise, it is the amount of physical memory or the quota for the process, whichever is smaller. For the WINDOWS brand operating system, one may determine if a hard working set quota is set and that quota's magnitude via GetProcessWorkingSetSizeEx. If the returned Flags contain QUOTA_LIMITS_HARDWS_ENABLE, then a hard working set quota is in effect, and the quota size is returned as the maximum working set size via lpMaximumWorkingSetSize. The Available Quota Memory is the Available Physical Memory of the host machine or the difference between the Total Quota Memory and the Cache Memory, whichever is smaller.

As is apparent from the first part of the algorithm (AM/TM or AQ/TQ), the more available memory, the faster the block cache may grow. In addition, as available memory approaches zero, then the cache growth rate shall also approach zero. This fact means that as memory becomes scarce more time is given to the operating system to produce more available memory via working set trimming and other mechanisms which increases the stability of the computer 102. It also means that it is not possible for the block cache 508 to grow beyond the size of physical memory 500 or its quota.

The change in Block Evictions per unit time (dBE/dt) is computed from an increment only counter maintained by the block cache manager 306 or 308. This counter is incremented every time the contents of a block are removed for the purpose of replacing them with different contents. For example, if the application 302 is a database cache, then replacing the contents of File 1, Page 102 with the contents of File 4, Page 8876 as the result of a cache miss during a seek operation would increment the counter. In accordance with one embodiment of the invention, as new blocks are added as a result of step 608, above, they are flagged as "newly allocated" such that they can be discounted as unused during the target computation. Also, in accordance with another embodiment, as new blocks are removed, they cause a direct reduction in the cache size but they do not count as "block evictions" for the purposes of the equation.

To abstract the available block production mechanism of the cache, a block eviction is not counted when the contents are removed. Rather, a block eviction is counted at the time when that block is actually reused (i.e. loaded with the new contents). If counted instead at the time of removal, a block cache might victimize blocks ahead of time in batches so that it may grow artificially. Further, basing the block evictions upon actual reuse guarantees the cause and effect relationship between block consumption and block eviction are directly linked, which enables an application to be charged for memory demand (the cause of the eviction) when it actually happens.

The block eviction is computed from a running counter for a particular application (e.g., the application 302) so that dBE/dt represents every block eviction for that application during the interval dt. If, alternatively, a variable were used that represented the average rate as input and dt did not match the sampling interval or timing of that variable, then potential inaccuracies could occur in the result of the equation. This is notable because, in practice, dt is typically not a specific number such as one second, because threads typically cannot wake up at exact intervals on a general purpose operating system. Thus, in accordance with one embodiment of the invention, the implementation is capable of handling a wide range of values for dt.

A "Virtual Memory Page Eviction" is the act of removing the contents of a virtual memory page 310 for the purpose of loading it with the contents of another virtual memory page. The Virtual Memory Page Evictions are measured relative to all processes, and not just the application for which the block cache is being sized. Alternatively, the Virtual Memory Page Evictions may be measured as the sum of a per-process counter for some or all of the processes on the computer 102. Virtual Memory Page Evictions are analogous to Block Evictions except that they concern the removal of a virtual page from a physical page for its reuse by a different virtual page. In accordance with an embodiment of the invention, the same accounting rules apply as for Block Evictions (i.e., reuse required before actual counting is allowed). In the WINDOWS brand operating system, the increment only counter representing page evictions is available as the operating system performance counter "Transition Pages RePurposed/sec" under the "Memory" performance object.

Under the algorithm above, idle block caches do not grow but instead shrink because the block eviction rate of an idle block cache is zero but the page eviction rate can still be non-zero. Also, as the block cache size approaches the data set size then block evictions drop towards zero because there are fewer cache misses. As such, the block cache growth rate also approaches zero. This means that the block cache does not grow to exceed the size of what it is caching.

The Virtual Memory Page Evictions help to balance the size of the operating system file cache 502. If a computer's file cache is a subset of available memory, prior art algorithms and other cache sizing methods may result in the block cache manager sizing an application's block cache at the expense of the operating system's file cache 502. The above algorithm can preserve a large amount of available memory for the file cache as a natural result of its response to the rate of Virtual Memory Page Evictions when that memory use is caused by the file cache 502.

A "Virtual Memory Page Reclamation" is the return of a virtual memory page 310 to a working set that was previously removed (taken out from the working set) by the operating system due to memory constraints.

The virtual memory page 310 must not have been evicted. The Virtual Memory Page Reclamation is another counter that may use the same accounting methods as the Block Evictions counter (e.g., the counter is incremented only after the virtual memory page 310 has been returned). In accordance with one aspect of the present invention, the collection of this counter requires analysis of more general data from the virtual memory manager 301 by an application.

The presence flag 404 may used to indicate a block's presence in the host process' working set. Initially, each allocated block is assumed to be present in the working set (e.g., the presence flag 404 is initially set to "1" for each block). The presence flag 404 is reset (e.g., set to "0") if any of the virtual memory pages it resides on are removed from the process' working set. As discussed above, depending upon the size of the blocks and the size of the pages, a single block may reside on one or more virtual memory pages.

Each time a block is accessed or allocated in the cache, the status of the presence flag 404 is checked. If the presence flag 404 is set then no special action is taken. If the flag is reset, then an attempt will be made to reclaim the page into the working set. An example of how the reclamation may be made is shown in FIG. 7.

Figure 7:
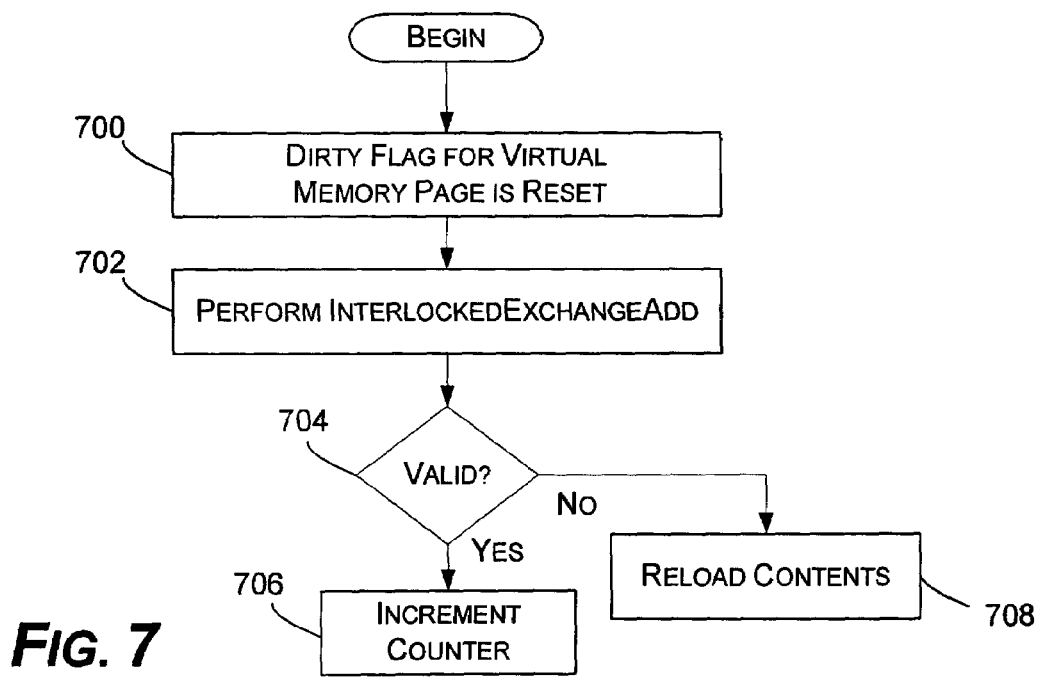
FIG. 7 is a flow diagram illustrating an example of how virtual memory page reclamations may be tracked in accordance with an embodiment of the invention.

The process of FIG. 7 starts with a block being accessed or allocated. At step 700, the dirty flag 314 for the virtual page or pages (e.g., the virtual memory page 310) underneath the block is reset. Resetting the dirty flag 314 has the effect that if the virtual memory page 310 was evicted, then it will act as newly allocated memory when it is touched. At step 702, an InterlockedExchangeAdd of zero is performed on the first word of every virtual memory page comprising the block. The InterlockedExchangeAdd function is specific to the WINDOWS brand operating system, and performs an atomic addition of an increment value to an addend variable. The function prevents more than one thread from using the same variable simultaneously. A similar function may be used in another environment. In this example, the function simultaneously touches the virtual memory page 310 and cancels the effect of the resetting the dirty flag 314. At this point, any pages comprising the block that were evicted are now memory resident but full of zeroes. At step 704, the validity of the contents of the block is tested. For example, a block checksum may be stored with each block, and this checksum may be evaluated to determine validity. If the contents are valid then the block has been successfully "reclaimed" into the working set and the counter is incremented at step 706. Otherwise, the counter is not incremented and the contents of the block are reloaded at step 708.

Sometimes, the contents of a block cannot be permitted to be lost in this destructive process. For example, this may be a database cache and the contents of the block to be tested need to be written back to a database file. The contents may be tested, for example, by examining the dirty flag 402 for the block. In this case, the reclamation process may not be attempted but every virtual memory page 310 underneath the block may be touched to force it back into memory and the page is counted as reclaimed. This may cause a read from the swap file but the data will not be lost. In fact, it is this exact effect that the above mechanism is trying to avoid. The elimination of paging I/O during reclamation prevents the swap file from becoming a bottleneck while the system is searching for a new equilibrium after memory has been trimmed from the working set of the process containing the block cache.

The presence flag 404 on every block in the cache should be reset whenever a virtual memory page 310 underneath that block is removed from the host process' working set by the virtual memory manager 301. This process is implemented by a thread that watches the virtual memory manager 301 for signs that it is removing pages from the cache. Because these pages are always dirty (i.e., the dirty flag 314 for each of the virtual memory pages 310 indicates that the page needs to be written out to the swap file), they will cause writes to the swap file when they are removed from the process' working set. On the WINDOWS brand operating system, this can be detected by a change in the performance counter "Pages Output/sec" under the "Memory" performance object which is an increment only counter that represents the total number of pages written to the swap file. Once this change is detected, then the thread calls QueryWorkingSet (in the WINDOWS brand operating system; different functions may be used in other environments) for a list of every virtual memory page that is currently resident in the process' working set. This list is converted into a sparse bitmap where one bit represents one page of the address space of the process. Finally, this bitmap is queried by the thread for the address ranges that comprise the block cache. Each block that is not entirely backed by resident virtual memory pages has its presence flag 404 reset.

Figure 8:
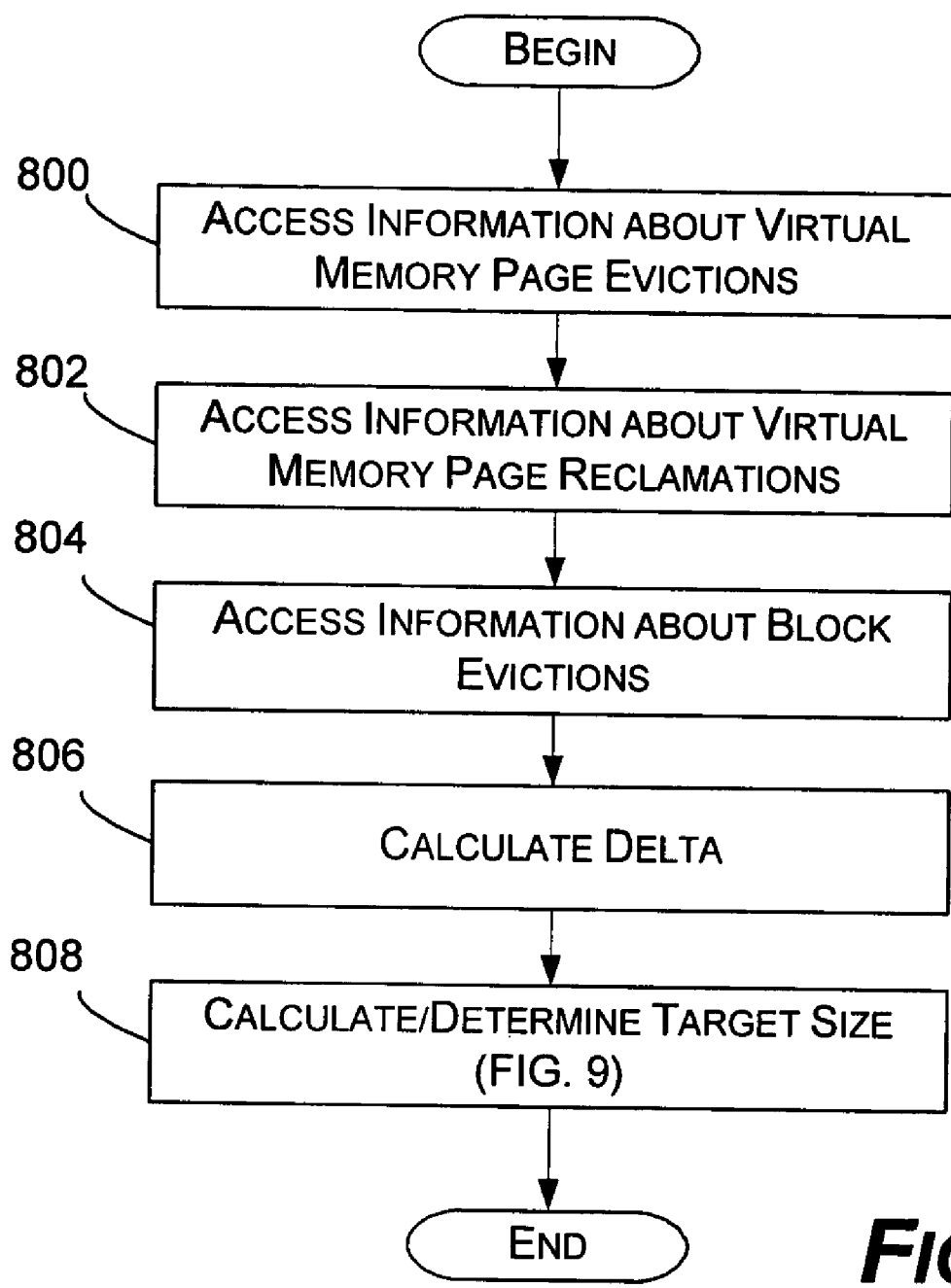
FIG. 8 is a flow chart showing generally steps for determining the delta for the change in target size of a block cache in accordance with an embodiment of the present invention.

FIG. 8 is a flow chart showing generally steps for determining the delta for the change in target size of a block cache in accordance with an embodiment of the present invention. Beginning at step 800, information about virtual page reclamations are accessed, such as by the counter described above. At step 802, information about virtual memory page reclamations is accessed. For each of these, the respective counter associated with the operating system may be accessed as needed, or the information may be gathered via another method.

At step 804, information about block evictions is accessed, for example via the counter maintained by the cache manager 306 or 308. The information gathered in steps 800, 802, and 804 is used to calculate the delta in step 806, for example using the algorithm described above. The target size may then be calculated in step 808 (FIG. 9).

Figure 9:
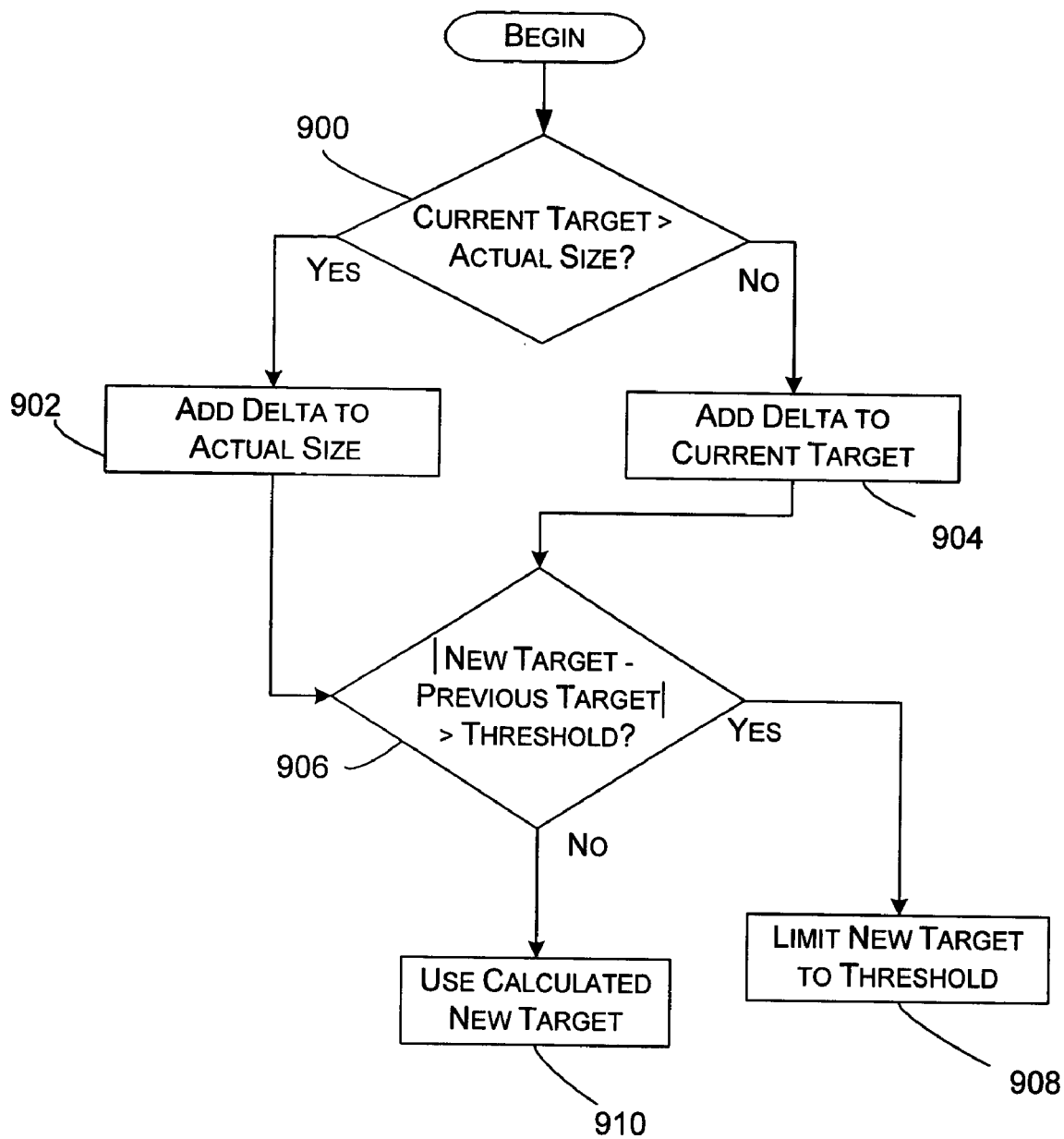
FIG. 9 is a flow chart generally representing steps for calculating a target block cache size in accordance with an embodiment of the invention.

FIG. 9 shows generally steps for determining a size of the block cache 508 for an application in accordance with one embodiment of the invention. These steps correspond to step 604 in FIG. 6. The steps may begin at the start of the application, where the block cache size may start at a preset value or zero, or may represent operation during a point after start up.

At step 900, a determination is made whether current target cache size or the current actual cache size is larger. If the target cache size is larger, then delta is added to the actual size at step 902. If actual cache size is larger, then the delta is added to the target size in step 904. As such, when the desire is to increase the cache size, the delta is added to the actual cache size, and not the previous target cache size Effectively, this process "overlaps" unused growth deltas such that the cache does not grow faster than it can actually use the memory. In contrast, when the block cache is shrinking, the delta (which is negative) is added to the previous target size. This effectively accumulates shrink deltas in preference to grow deltas so that subsequent iterations of the control loop do not forget shrink deltas from previous iterations.

At step 906, a determination is made whether the absolute value of the change between the current target cache size and the new target cache size is greater than a threshold. If so, step 906 branches to step 908, where the new target is limited by the threshold. Otherwise, the process branches to step 910, where the calculated new target is used.

As an example, the threshold may be 5 percent of the total physical memory on the system. This threshold may serve as a limit to the rate at which the block cache size can change, and thereby increases the stability of the entire system by allowing other caches or working sets to adjust to changes to a block cache.

A prior art algorithm utilized by Microsoft Corporation, the assignee of the present invention, and shown in FIG. 10 utilized a similar algorithm, but it did not utilize the change in Virtual Memory Page Reclamations (dPR/dt) at all. In addition, instead of Virtual Memory Page Evictions, Approximated Virtual Memory Page Evictions were utilized. Further, the prior algorithm did not handle quotas.

The Approximated Virtual Memory Page Evictions concern a calculation of the approximate victimization of virtual memory pages from process working sets. Under prior WINDOWS brand operating systems, this approximation was made via the operating system performance counter "Page Faults/sec" under the "Memory" performance object. This raw counter was further processed to achieve the desired results. Specifically, the counter was phased in as a function of the Available Physical Memory on the system. The processed counter was zero when there are more than 1125 pages of memory available. The processed counter was equal to the raw counter when there were less than 1024 pages of memory available. The processed counter was also linearly adjusted between those two limits to reduce the oscillation in the equation as available memory transits the 1024 page threshold.

The algorithm shown in FIG. 10 had many problems. First, for the WINDOWS brand operating system, the algorithm may starve the file cache of the host system. This happened because the algorithm always converged on about 1024 pages of available memory and the file cache is a strict subset of available memory. As a result, complex servers that require efficient database caching and efficient file caching only received efficient database caching. An embodiment of the present invention addresses this problem by preserving a large amount of available memory for the file cache as a natural result of its response to the rate of Virtual Memory Page Evictions when that memory use is caused by the file cache 502.

Second, the prior algorithm could be easily fooled by an application due to the diverse nature of a page fault. A page fault can occur for many different reasons in an operating system. For example, a page fault can occur when a newly allocated page is touched for the first time, consuming an available page in the process. If one were to run an application on a system that quickly allocated, touched, and freed virtual memory in a tight loop then the system would see a very high page fault count. However, the freed memory does not contain any data and thus doesn't count as a page eviction when it is subsequently reused. This means that this application could cause very high apparent memory pressure by causing rapid page faults without actually evicting memory pages. Also, this apparent memory pressure can be sustained indefinitely which can cause all the caches managed by the algorithm to shrink to zero size. An embodiment of the present invention addresses this problem by maintaining counters to track Page Evictions and Page Reclamations instead of page faults.

In addition, the prior algorithm failed to handle the catastrophic case of having most of a process' working set suddenly trimmed by the virtual memory manager. In WINDOWS brand operating systems, this trimmed working set becomes available memory. The algorithm would then see a large amount of available memory and grow. This caused a runaway effect where the cache would keep growing, get trimmed again, grow again, and so on. There was no negative feedback in this case so the cache size must be recovered manually, usually by a reboot. The present algorithm addresses this problem by provided feedback in the form of Page Evictions and Page Reclamations.

Using the algorithm of the present invention has many advantages over prior systems for managing block cache size. As an example, in accordance with one embodiment, multiple block caches 508 may balance against each other equitably because the change in the page eviction count of the computer 102 is divided amongst the block caches in proportion to their sizes. Because the page eviction count is known to all caches and each cache knows its own size, each cache may respond predictably and proportionately to the same control signal which enables them to balance effectively with each other and the rest of the system. Moreover, as described above, the algorithm permits actions of the file cache 502 to be taken into account so that the file cache is not consumed by application of the algorithm.

This invention also has a dramatic impact on the flexibility of the computer 102. As an example, assume the computer 102 is operating as a server. Previously, if one wished to setup a single machine that hosts multiple server processes, then a fixed amount of memory would be assigned to each server process. This amount of memory would need to be large enough to handle the peak load of each server. Such memory may be poorly chosen, or may not be available as requested. Utilizing an embodiment of the present invention, it is possible to host multiple servers on the same machine and have them cooperatively share memory. For example, if one server process peaks in the morning and the other server process peaks in the afternoon then the first will get more memory in the morning and the second will get more memory in the evening. This increases the effective capacity of the computer 102. Further, if there is a transient load such as a virus check then the server process may automatically relinquish some of its memory to make the total machine activity run more efficiently. Once that transient load has completed, then the server will automatically reabsorb the memory used by that load.

The present invention eliminates the need for an administrator to manually tune the block cache memory of a given server which lowers the total cost of ownership of the server. The benefits here are two-fold. First, use of the algorithm saves the client from the costs of administrative training required to perform tuning manually. Second, the algorithm tunes the cache in real time at a frequency far higher than could be expected of even the most dedicated administrator which in turn maximizes the memory efficiency of the server at all times.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method, comprising:
   accessing information about virtual memory page evictions for a computer, wherein the virtual memory page evictions correspond to virtual memory pages that are managed by an operating system of the computer, and wherein a virtual page eviction includes removal of contents of a virtual memory page for a purpose of loading the virtual memory page with contents of another virtual memory page;
   accessing information about block evictions for an application on the computer, wherein the block evictions correspond to blocks of memory utilized by the application;
   accessing information about virtual memory page reclamations for a computer, wherein a virtual memory page reclamation includes a return of a virtual memory page to a working set after the virtual memory page was previously removed (taken out from the working set) due to memory constraints; and
   determining a target size for a block cache for the application based at least upon the information about the virtual memory page reclamations.

2. The method of claim 1, further comprising, sizing the block cache in accordance with the target size.

3. The method of claim 1, further comprising determining the target size for the block cache based at least upon information about the virtual page evictions and the block evictions.

4. The method of claim 3, wherein said accessing information about virtual memory page reclamations comprises maintaining presence information regarding the presence of a block in a working set for the application.

5. The method of claim 4, wherein the presence information is maintained for each block via a flag associated with the block.

6. The method of claim 1, wherein said accessing information about virtual memory page reclamations comprises resetting a dirty flag for each virtual memory page underlying the block upon accessing or allocating the block.

7. The method of claim 1, wherein determining a target size comprises calculating a change in target size per unit time.

8. The method of claim 7, wherein the change in target size is calculated according to the following algorithm:

$$dCM/dt = AM/TM * dBE/dt - CM/TM * dPE/dt - dPR/dt$$

Where:
   CM comprises size of the memory of the block cache
   AM comprises available physical memory or available quota memory on the computer
   TM comprises total physical memory or total quota memory on the computer
   BE comprises Block Evictions
   PE comprises Virtual Memory Page Evictions
   PR comprises Virtual Memory Page Reclamations
   t comprises time.

9. The method of claim 7, wherein the change in target size is added to the smallest of an actual size of the block cache and a previous target size to produce a new target size.

10. The method of claim 9, wherein change from a previous target size to the new target size is maintained within a threshold.

11. A computer-readable medium having computer-executable instructions for performing the method of claim 1.

12. A computer-implemented method, comprising:
   accessing information about virtual memory page reclamations for a computer, wherein the virtual memory page reclamations correspond to virtual memory pages that are managed by an operating system of the computer, and wherein a virtual memory page reclamation includes a return of a virtual memory page to a working set after the virtual memory page was previously removed (taken out from the working set) by the operating system due to memory constraints;
   accessing information about block evictions for an application on the computer, wherein the block evictions correspond to blocks of memory utilized by the application; and
   determining a target size for a block cache of the application based at least upon the information about the virtual memory page reclamations and the information about the block evictions.

13. The method of claim 12, further comprising, sizing the block cache in accordance with the target size.

14. The method of claim 12, wherein said accessing information about virtual memory page reclamations comprises maintaining presence information regarding the presence of a block in a working set for the application.

15. The method of claim 14, wherein the presence information is maintained via a flag associated with each block.

16. The method of claim 12, wherein said accessing information about virtual memory page reclamations comprises resetting a dirty flag for each virtual memory page underlying the block upon accessing or allocating the block.

17. The method of claim 12, wherein determining a target size comprises calculating a change in target size per unit time.

18. The method of claim 12, wherein the change in target size is calculated according to the following algorithm:

$$dCM/dt=AM/TM*dBE/dt-CM/TM*dPE/dt-dPR/dt$$

Where:
CM comprises size of the memory of the block cache
AM comprises available physical memory or available quota memory on the computer
TM comprises total physical memory or total quota memory on the computer
BE comprises Block Evictions
PE comprises Virtual Memory Page Evictions
PR comprises Virtual Memory Page Reclamations
t comprises time.

19. The method of claim 17, wherein the change in target size is added to the smallest of an actual size of the block cache and a previous target size to produce a new target size.

20. The method of claim 19, wherein change from a previous target size to the new target size is maintained within a threshold.

21. A computer-readable medium having computer-executable instructions for performing the method recited in claim 12.

22. A computer-implemented method, comprising:
accessing information about virtual memory page evictions on a computer;
accessing information about virtual memory page reclamations for the computer, wherein the virtual memory page reclamations and evictions correspond to virtual memory pages that are managed by an operating system of the computer, and wherein a virtual memory page reclamation includes a return of a virtual memory page to a working set after the virtual memory page was previously removed (taken out from the working set) by the operating system due to memory constraints;
accessing information about block evictions for an application on the computer, wherein the block evictions correspond to blocks of memory utilized by the application; and
determining a target size for a block cache of the application based at least upon the information about the virtual memory page reclamations, the information about the virtual memory page evictions, and the information about the block evictions by using the following algorithm:

$$dCM/dt=AM/TM*dBE/dt-CM/TM*dPE/dt-dPR/dt$$

Where:
CM comprises size of the memory of the block cache
AM comprises available physical memory the computer
TM comprises total physical memory the computer
BE comprises Block Evictions
PE comprises Virtual Memory Page Evictions
PR comprises Virtual Memory Page Reclamations
t comprises time.

23. A computer-implemented method, comprising:
accessing information about virtual memory page evictions on a computer;
accessing information about virtual memory page reclamations for the computer, wherein the virtual memory page reclamations and evictions correspond to virtual memory pages that are managed by an operating system of the computer; and wherein a virtual memory page reclamation includes a return of a virtual memory page to a working set after the virtual memory page was previously removed (taken out from the working set) by the operating system due to memory constraints;
accessing information about block evictions for an application on the computer, wherein the block evictions correspond to blocks of memory utilized by the application; and
determining a target size for a block cache of the application based at least upon the information about the virtual memory page reclamations, the information about the virtual memory page evictions, and the information about the block evictions by using the following algorithm:

$$dCM/dt=AQ/TQ*dBE/dt-CM/TM*dPE/dt-dPR/dt$$

Where:
CM comprises size of the memory of the block cache
AQ comprises available quota memory on the computer
TQ comprises total quota memory on the computer
BE comprises Block Evictions
PE comprises Virtual Memory Page Evictions
PR comprises Virtual Memory Page Reclamations
t comprises time.

24. A computer-readable medium having computer-executable instructions for performing a method, the method comprising:
accessing information about at least (1) virtual memory page reclamations and (2) virtual memory page evictions for a computer, wherein the virtual memory page evictions and reclamations correspond to virtual memory pages that are managed by an operating system of the computer, and wherein a virtual memory page reclamation includes a return of a virtual memory page to a working set after the virtual memory page was previously removed (taken out from the working set) by the operating system due to memory constraints, and wherein a virtual page eviction includes removal of contents of a virtual memory page for a purpose of loading the virtual memory page with contents of another virtual memory page;
accessing information about block evictions for an application on the computer, wherein the block evictions correspond to blocks of memory utilized by the application; and
determining a target size for a block cache of the application based at least upon (a) the information about the virtual memory page reclamations and (b) the information about the block evictions.

25. The computer-readable medium of claim 24, wherein the method further comprises sizing the block cache in accordance with the target size.

26. The computer-readable medium of claim 24, wherein said accessing information about virtual memory page reclamations comprises maintaining presence information regarding the presence of a block in a working set for the application.

27. The computer-readable medium of claim 26, wherein the presence information is maintained for each block via a flag associated with the block.

28. The computer-readable medium of claim 26, wherein said accessing information about virtual memory page reclamations comprises resetting a dirty flag for each virtual memory page underlying the block upon accessing or allocating the block.

29. The computer-readable medium of claim 24, wherein said determining a target size for a block cache of the application comprises determining the target size based at least upon (a) information about the virtual memory page reclamations for the computer, (b) information about the virtual memory page evictions for the computer, and (c) the information about the block evictions.

30. The computer-readable medium of claim 29, wherein determining a target size comprises calculating a change in target size per unit time.

31. The computer-readable medium of claim 30, wherein the change in target size is calculated according to the following algorithm:

$$dCM/dt = AM/TM * dBE/dt - CM/TM * dPE/dt - dPR/dt$$

Where:
CM comprises size of the memory of the block cache
AM comprises available physical memory or total quota memory on the computer
TM comprises total physical memory or total quota memory on the computer
BE comprises Block Evictions
PE comprises Virtual Memory Page Evictions
PR comprises Virtual Memory Page Reclamations
t comprises time.

32. The computer-readable medium of claim 31, wherein the change in target size is added to the smallest of an actual size of the block cache and a previous target size to produce a new target size.

33. The computer-readable medium of claim 31, wherein the change from a previous target size to the new target size is maintained within a threshold.

34. A computer system, comprising:
physical memory;
an application stored within the computer system; and a cache memory manager configures and adapted to:
access information about at least (1) virtual memory page reclamations and (2) virtual memory page evictions for the computer, wherein the virtual memory page evictions and reclamations correspond to virtual memory pages that are managed by an operating system of the computer, and wherein a virtual memory page reclamation includes a return of a virtual memory page to a working set after the virtual memory page was previously removed (taken out from the working set) by the operating system due to memory constraints, and wherein a virtual page eviction includes removal of contents of a virtual memory page for a purpose of loading the virtual memory page with contents of another virtual memory page;
access information block evictions for the application, wherein the block evictions correspond to blocks of memory utilized by the application; and
determining a target size for a block cache of the application based at least upon (a) the information about the virtual memory page reclamations and (b) the information about the block evictions.

35. The computer system of claim 34, wherein said accessing information about virtual memory page reclamations comprises maintaining presence information regarding the presence of a block in a working set for the application.

36. The computer system of claim 35, wherein the presence information is maintained for each block via a flag associated with the block.

37. The computer system of claim 35, wherein said accessing information about virtual memory page reclamations comprises resetting a dirty flag for each virtual memory page underlying the block upon accessing or allocating the block.

38. The computer system of claim 34, wherein said determining a target size for a block cache of the application comprises determining the target size based at least upon (a) information about the virtual memory page reclamations for the computer, (b) information about the virtual memory page evictions for the computer, and (c) the information about the block evictions.

39. The computer system of claim 38, wherein determining a target size comprises calculating a change in target size per unit time.

40. The computer system of claim 39, wherein the change in target size is calculated according to the following algorithm:

$$dCM/dt = AM/TM * dBE/dt - CM/TM * dPE/dt - dPR/dt$$

Where:
CM comprises size of the memory of the block cache
AM comprises available physical memory or total quota memory on the computer
TM comprises total physical memory or total quota memory on the computer
BE comprises Block Evictions
PE comprises Virtual Memory Page Evictions
PR comprises Virtual Memory Page Reclamations
t comprises time.

41. The computer system of claim 40, wherein the change in target size is added to the smallest of an actual size of the block cache and a previous target size to produce a new target size.

42. The computer system of claim 41, wherein the change from previous target size to the new target size is maintained within a threshold.

43. A computer system, comprising:
physical memory;
an application stored within the computer system; and
means for accessing information about at least (1) virtual memory page reclamations and (2) virtual memory page evictions for the computer , wherein the virtual memory page evictions and reclamations correspond to virtual memory pages that are managed by an operating system of the computer, and wherein a virtual memory page reclamation includes a return of a virtual memory page to a working set after the virtual memory page was previously removed (taken out from the working set) by the operating system due to memory constraints, and wherein a virtual page eviction includes removal of contents of a virtual memory page for a purpose of loading the virtual memory page with contents of another virtual memory page;
means for accessing information about block evictions for the application, wherein the block evictions correspond to blocks of memory utilized by the application; and means for determining a target size for a block cache of the application based at least upon (a) the information about the virtual memory page reclamations and (b) the information about the block evictions.

44. The computer system of claim 43, wherein said accessing information about virtual memory page reclamations comprises maintaining presence information regarding the presence of a block in a working set for the application.

45. The computer system of claim 44, wherein the presence information is maintained for each block via a flag associated with the block.

46. The computer system of claim 44, wherein said accessing information about virtual memory page reclamations comprises resetting a dirty flag for each virtual memory page underlying the block upon accessing or allocating the block.

47. The computer system of claim 43, wherein said determining a target size for a block cache of the application comprises determining the target size based at least upon (a) information about virtual memory page reclamations for the computer, (b) information about the virtual memory page evictions for the computer, and (c) the information about the block evictions.

48. The computer system of claim 47, wherein determining a target size comprises calculating a change in target size per unit time.

49. The computer system of claim 48, wherein the change in target size is calculated according to the following algorithm:

$$dCM/dt = AM/TM*dBE/dt - CM/TM*dPE/dt - dPR/dt$$

Where:
- CM comprises size of the memory of the block cache
- AM comprises available physical memory or total quota memory on the computer
- TM comprises total physical memory or total quota memory on the computer
- BE comprises Block Evictions
- PE comprises Virtual Memory Page Evictions
- PR comprises Virtual Memory Page Reclamations
- t comprises time.

50. The computer system of claim 49, wherein the change in target size is added to the smallest of an actual size of the block cache and a previous target size to produce a new target size.

51. The computer system of claim 50, wherein the change from a previous target size to the new target size is maintained within a threshold.

* * * * *

UNITED STATES PATENT AND TRADEMARK OFFICE
CERTIFICATE OF CORRECTION

PATENT NO. : 7,047,387 B2  Page 1 of 1
APPLICATION NO. : 10/620938
DATED : May 16, 2006
INVENTOR(S) : Andrew E. Goodsell It is certified that error appears in the above-identified patent and that said Letters Patent is hereby corrected as shown below:

In column 15, line 16, in Claim 18, delete "claim 12," and insert -- claim 17, --, therefor.

In column 16, line 11, in Claim 23, delete "computer;" and insert -- computer, --, therefor.

Signed and Sealed this

Thirtieth Day of March, 2010

David J. Kappos
*Director of the United States Patent and Trademark Office*